June 14, 1938.  V. J. ROPER  2,120,869
APPARATUS FOR TESTING PROJECTION LAMPS
Filed Dec. 14, 1933
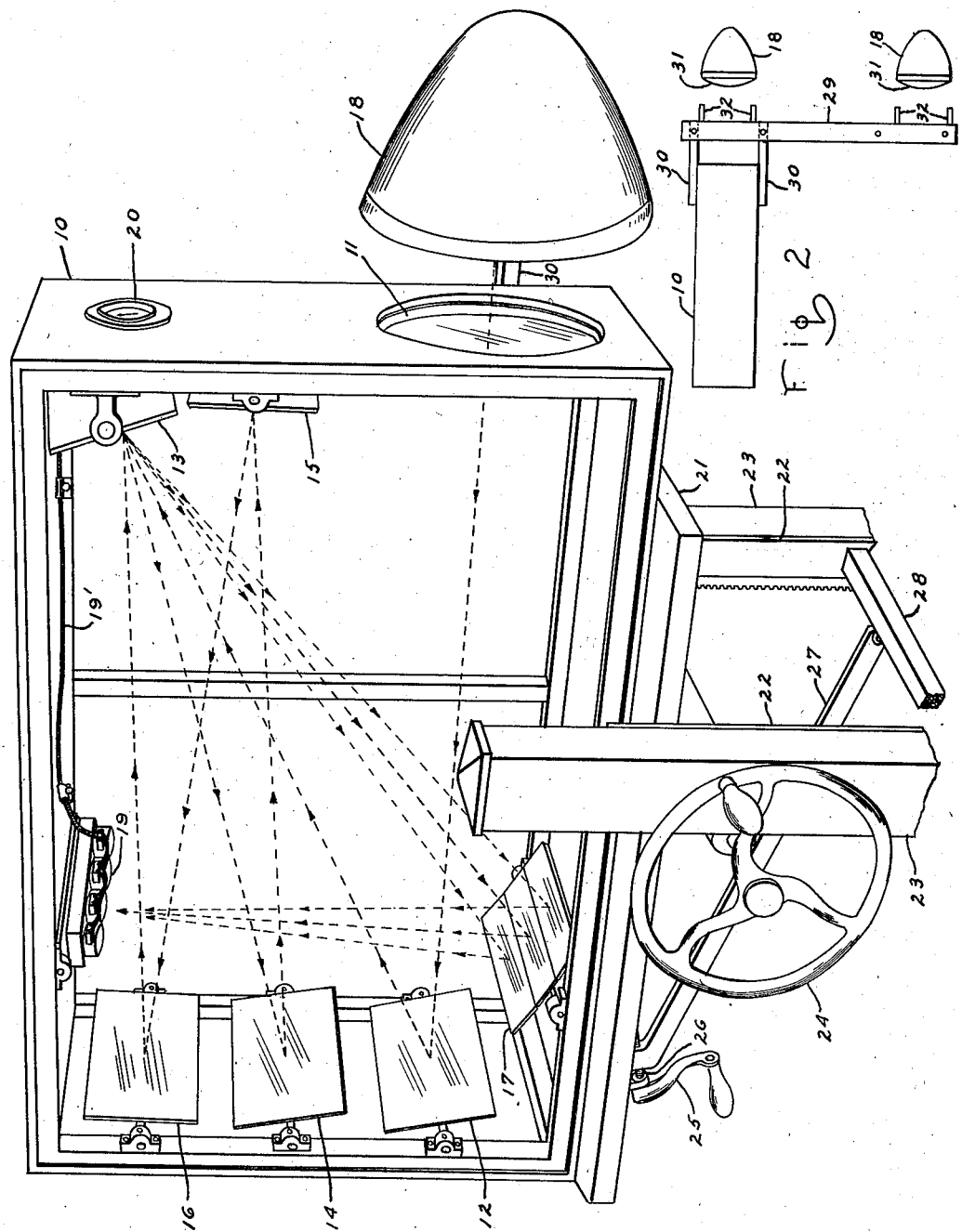
INVENTOR
VAL J ROPER
BY Harry E. Dunham
HIS ATTORNEY

Patented June 14, 1938

2,120,869

UNITED STATES PATENT OFFICE

2,120,869

APPARATUS FOR TESTING PROJECTION LAMPS

Val J. Roper, Cleveland Heights, Ohio, assignor to General Electric Company, a corporation of New York Application December 14, 1933, Serial No. 702,358

2 Claims. (Cl. 88—14)

My invention relates to testing devices and more particularly to optical devices for testing projection lamps such as vehicle headlamps.

Those skilled in the art of headlighting generally have preferred to adjust headlamps on a motor vehicle by placing the vehicle on a level floor about twenty-five feet from a screen in a darkened room and observing the beam from said headlamps on a screen, which is marked off with suitable horizontal and vertical lines.

One of the objects of my invention is to eliminate the necessity for a level floor twenty-five feet or more in length, the distance between car and screen, and the need of a darkened room.

Another object is to eliminate the personal factor of judgment as to the high intensity part of the beam, which judgment is affected by surrounding conditions. My invention provides for a quantitative measure of the maximum intensity of the beam. This is important from the standpoint of state laws and regulations and the interest of safety.

Another object is the provision of a device giving an indication of the need for attention to various items in the lighting system of a motor car, such as the reflectors, bulbs, sockets, wiring, connectors, battery, etc., as shown by the lack of sufficient intensity of the beams from the headlamps.

Still another object is the provision of an indicating instrument of a type which is intelligible to the client, giving him a visual report of the present condition of his headlamps as compared with what they should be.

According to my invention the above-mentioned objects are obtained by providing a testing device, comprising a light-sensitive device such as a photo-electric cell, which is set in the path of the light beam from the projection lamp which beam is preferably reflected back and forth by a plurality of mirrors to simulate the effect of a substantial distance between the projection lamp and light-sensitive device. The amount of light from the projector which falls upon the light-sensitive device is preferably recorded on a meter which should show a certain predetermined efficiency reading for the particular projector being tested. If the reading is below its predetermined value the projector is adjusted or aimed until the maximum reading is obtained. If the reading is still below the predetermined value, the lamp should be focused with respect to the reflector, where such adjustment is provided for. Then, if the reading is still low, the condition of the reflector, lamp, wiring, plugs, etc. should be checked and the faulty member reconditioned or replaced to allow the projector to attain the proper efficiency reading. The testing device thus provides means for a complete check-up of a projector, both as to its optical efficiency as well as to its physical condition as far as the latter bears on the optical efficiency. Further features and advantages of my invention will appear from the following description of species thereof.

In the drawing, Fig. 1 is a perspective view of a testing device comprising my invention with one side of the enclosure removed; and Fig. 2 is a diagrammatic plan view at a reduced scale showing means for lining-up the device with respect to a pair of vehicle headlamps.

Referring to Fig. 1, the device comprises a box or enclosure 10 which is preferably made impervious to light except for a window 11 in the front wall thereof. A number of mirrors 12 to 17 inclusive, are mounted within the box 10 and are so positioned that the light from a projection lamp 18, correctly located in front of the window 11, will be reflected back and forth and will finally be directed toward a light-sensitive device 19, such as a photo-electric cell, or a plurality of such cells. The mirror 17 preferably consists of a plurality of sections (three being shown), each section being aimed so as to direct substantially all the light from mirror 13 toward the light-sensitive device 19. The cells 19 are connected by conductors 19' to a meter 20, mounted on the box 10, which gives an indication proportionate to the amount of light falling upon the said cells. Means are provided for raising or lowering the box 10 and also for tilting it forward or backward as well as swinging it to the left or right. The means shown in the drawing is merely illustrative and consists of a photographer's stand comprising a table 21 which is mounted on slides 22 which are moved vertically up or down in posts 23 by means of the hand wheel 24. The said posts 23 are supported on a triangular base (not shown) fitted with casters. The table 21 is tilted by means of a crank 25 mounted on a screw 26 which is mounted on the table and carries one end of an arm 27, the other end of which is pivotally mounted on a cross arm 28 which is mounted on the slides 22.

Means are also provided for setting or squaring the device with respect to a pair of headlamps 18 (Fig. 2) carried by a vehicle (not shown). The means, as shown in Fig. 2, may comprise a bar 29 mounted squarely across the front of the box 10 on a pair of arms 30 which are mounted on the sides of said box. To square-up the box 10 it is moved toward the headlamps 18 until the bar 29 rests against the front of both of said headlamps. When headlamps having convex lenses 31 are being tested it may be desirable to provide fingers 32 on said bar 29 which engage opposite sides of the rim of the headlamp. The said fingers 32 are preferably slidably mounted on the bar 29 to accommodate headlamps of different sizes.

In operation, the device is placed in front of a headlamp 18 so that the window 11 is opposite said headlamp and the box 10 is squared-up with respect to a line across the headlamps at right angles to the axis of the vehicle, by moving it forward until the bar 29 or fingers 32 come in contact with the faces of said headlamps. When measuring the efficiency of a beam of light from the headlamp 18 which is depressed below the horizontal, the box 10 may be tilted downward at the back, by means of the handle 25 at an angle corresponding to the correct angle of depression for the beam. The light from the projector or headlamp is directed upon the mirror 12 and then reflected respectively toward mirrors 13, 14, 15, 16, 13, 17, thence toward the light-sensitive device 19. The system of mirrors gives the effect of testing the beam at a point a substantial distance ahead of the projector,—a distance, preferably, of twenty feet or more. Each particular projector has a predetermined efficiency rating, as indicated by the meter 20, and if the projector being tested does not show the proper reading, it should be aimed or adjusted to the position at which the reading on the said meter is highest. If the reading is still low, the lamp in the projector should be checked for proper focal adjustment, where such adjustment is possible. Then, if the reading is still below normal, the condition of the reflector, lamp, wiring, plugs, etc., should be checked and the faulty member reconditioned or replaced to allow the projector to attain the proper efficiency reading.

The testing device is particularly applicable to vehicle headlamp testing, where the beam comprises a so-called "hot spot", or zone of high intensity, which is generally located at the top and at the middle, laterally, of the beam, since the point of highest intensity of said hot spot is at the center thereof. This means that the reading of the meter 20 will be at a maximum when the center of the said hot spot is directed toward the light sensitive device 19, thus making possible a very accurate adjustment of the headlamp. In testing a headlamp having a beam asymmetric laterally, the box 10 may be pivoted in a horizontal plane to an angle corresponding to the horizontal angle of diversion of the high-intensity portion of the asymmetric beam, or the lens of the headlamp may be removed and the concentrated beam from the reflector aimed; the lens being replaced after the aiming is accomplished. In the latter case however, because of the concentrated beam, a light absorbing screen may be provided on the window 11 or the number of cells 19 may be decreased, or a resistance inserted so that a reading can be obtained on the meter 20.

What I claim as new and desire to secure by Letters Patent of the United States is:

1. A headlight testing device comprising a substantially rectangular light-impervious enclosure having a window in the front wall thereof, a light-sensitive cell mounted within said enclosure on the top wall thereof, a plurality of mirrors mounted within said enclosure on the back and front walls thereof and a mirror mounted on the bottom wall of said enclosure whereby a beam of light is reflected back and forth by said first-mentioned mirrors, thence toward said last-mentioned mirror and thence toward said light-sensitive cell so that the path of the beam has a definite length, and means for indicating the amount of light falling upon said light-sensitive cell.

2. A headlight testing device comprising a substantially rectangular light-impervious enclosure having a window in the front wall thereof, a light-sensitive cell mounted within said enclosure on the top wall thereof, a plurality of mirrors mounted within said enclosure on the back and front walls thereof and a light-concentrating mirror mounted on the bottom wall of said enclosure whereby a beam of light is reflected back and forth by said first-mentioned mirrors and thence toward said last-mentioned mirror which concentrates the beam and directs it toward said light-sensitive cell so that the path of the beam has a definite length, and means for indicating the amount of light falling upon said light-sensitive cell.

VAL J. ROPER.